Patented Sept. 27, 1927.

1,643,301

UNITED STATES PATENT OFFICE.

GEOFFREY ARTHUR GRAY, OF CINCINNATI, OHIO, AND MORTON BERNHARD NEWBURGER, OF COVINGTON, KENTUCKY.

PROCESS OF TREATING BUTTER CREAM.

No Drawing.    Application filed July 16, 1923.  Serial No. 651,978.

Our invention relates to the method of treating cream to be used in the manufacture of butter, by the addition of a relatively innocuous preservative effective for a predetermined period, and which can be afterwards removed at a later and predetermined stage in the butter making operation.

We have found that several very important and valuable results can be secured through the application of our discovery, to commercialized butter making and the handling of butter cream preparatory to shipment to the creamery, which results are not readily apparent on the face of the broad proposition of using a suitable preservative, and which main objectives and results may be briefly summarized as follows:

1. By our process all losses due to fermentation and consequent waste of butter cream from boiling over in shipping cans are definitely eliminated.

2. Heretofore it has been customary to make provision for this condition by underfilling the shipping cans, at increased cost of transportation per weight, and with no definite assurance of avoiding loss through fermentation.

3. By the employment of our method, the shipping vessels can be uniformly filled to approximate capacity, the treatment given, and the butter cream held during shipment and until the butter making, in the initial condition, without danger either of loss or impairment in quality or flavor.

4. It further results that a given batch of butter cream so shipped and treated, remains of absolutely uniform grade and flavor, which will yield a uniform butter product in flavor and value, and one which does not require the grading necessary in the use of untreated butter cream, where, at the time of usage, no two shipment cans of cream are in the same condition as to flavor, bacteria activity, species of animal organisms, or stage of fermentation.

5. By butter cream it is understood that we refer to a cream which, whether by nature or culture, is either in initial and a predetermined stage of fermentation prior to, or at the time of shipment, or which is sweet at the time of treatment and later brought into the requisite state of fermentation.

6. The employment of our treatment also enables the provision of uniform, definite, predetermined flavor of cream or butter; in short, the creamery is enabled to manufacture on the basis of known instead of unknown, and of constant instead of variant factors, in quantity production.

In practice, our invention is preferably employed as follows:

The producer or shipper of the butter cream fills the shipping vessels to uniform and approximate shipment capacity.

The preservative treatment may be applied to the butter cream in the container from which the shipment cans are filled, or it may be applied to the butter cream directly in the shipping cans before sealing.

The butter cream is suitably impregnated with a preservative having the characteristics of sulphurous acid. It is desirable to keep the preservative quantitatively as low as possible, and in practice we have found that the proportions desirable are:

(a) The equivalent of three one-hundredths per cent of sulphur dioxide to a given weight of cream.

Preferably the method of application of the preservative to the butter cream is as follows:

(b) The required amount of a salt of sulphurous acid is dissolved in a small amount of water and thoroughly mixed with the cream.

After the treatment, the cans, having been uniformly filled to approximate shipping capacity, are sealed and shipped to the creamery. Upon examination at destination, it will be found that the cream has been held in transit and during the storage period, so that no losses of butter fat have occurred from foaming over, by gas forming organisms, and it will be further found that the $SO_2$ preservative is quantitatively contained more in the liquid carrying the butter fats than in the butter fats per se, although some small percentages will be found with the butter fats. This is of no commercial consequence, since it is a portion of our discovery and treatment to follow up at the creamery with a second step of oxidation or evaporation, which will convert the $SO_2$ into innocuous and inert nonpreservative salts, or abstract it by evaporation or washing.

As a step preparatory to or during the butter making operations, we remove the residual $SO_2$ of butter cream by oxidation or evaporation, convert the sulphurous acid to sulphates, so that approximately all appreciable traces of the preservative disappear before the ultimate butter stage is reached in the manufacture.

It is not necessary, however, to oxidize by chemicalization, as we have discovered that satisfactory results may be obtained in the preservative elimination as a resultant of Pasteurizing, aerating, or in the churning process, which, while conventional, may be readily controlled, so that thorough oxidation of the $SO_2$ is physically effected, or through abstraction, the elimination is substantially complete.

These treatments, whether by chemicalization, or by physical manipulation, oxidize the residual $SO_2$ into innocuous sulphates and water existing in very small proportions in the butter.

In the case of $SO_2$ and other preservatives which may be converted into other nonpreservative compounds by oxidation, this may be accomplished by the use of oxidizing reagents such as $H_2O_2$, hydrogen peroxide. With sulphurous salts this reagent forms sulphates and water, both of which are harmless and nonpreservative in the proportions in which they are formed. Sulphates are commonly found in dairy salt and in table salts. In actual practice the addition of approximately the theoretical amount of $H_2O_2$ to cream treated with sodium sulphite reduced the amount of $SO_2$ from 0.036% in the original cream to 0.004% and the butter made from this cream showed no $SO_2$ whatever within the limits of accuracy of the method used. In the laboratory where an excess of peroxide was used no $SO_2$ could be found in the cream.

$SO_2$ can be oxidized also by the oxygen of the air during the processes of Pasteurization and aeration. A similar and more effective oxidation takes place in the churn where the action of the churn exposes the cream more thoroughly to the air. This could be made more effective by filling the churn with oxygen instead of air.

We have found that $SO_2$ may be oxidized by electrolysis. Cream containing 0.034% $SO_2$ was subjected to the action of alternating current long enough to raise the temperature from room temperature to 183° F. The cream then contained only 0.024% $SO_2$, a loss of over 29%. A similar test was made with direct current of low voltage in which the temperature rise was very slight. In one hour the amount of $SO_2$ was reduced to 0.023%, a loss of over 32%. By the use of suitable electrodes and stirring or mixing devices the action could be greatly hastened and made more effective. These tests were carried out in beakers with no stirrer and with very small electrodes.

We have also found that butter made from cream containing $SO_2$ will always contain more or less $SO_2$. However, by properly washing the butter, using sufficient water and changes of water, the amount remaining in the butter can be reduced to very small proportions, to less than ten parts in the million or even better. This can be accomplished in the commercial churn which is fitted with "workers" which knead the butter and work it together with the excess of water which is introduced into the churn. Here the $SO_2$ is washed out by diffusing into the wash water, or by the wash water displacing the liquid containing the $SO_2$ which is originally in the butter.

This discovery is not in any sense academic, but is of the greatest commercial importance.

The control of, and standardization of quality and grade of cream and butter resultant from our treatment, provides a new and important advantage to the butter manufacture, and comprises an element of economy, as well as quality improvement, the benefits of which extend to the consumer, as well as the manufacturer, producer and shipper of the butter cream.

An equally important advantage is the salvage in shipments, and the decreased cost of transportation.

A long study of the problem, observation, and calculation, based on obtainable data, shows that when this treatment is not employed, the butter fat loss runs between ½ of 1% and 1%, due to the foaming and rising of the fermented cream in the cans, which of course is greater in the warm months.

The partial filling of cans, which is a necessary practice according to the old methods, is a constant item of increased transportation cost, and to this economic waste must be added the employment of a greater number of cans, necessary to the partial filling system in vogue, and we also effect a great saving in the loss and renewal of cans.

While we have disclosed and described this invention as applied to butter cream, the process can be applied to the milk industry.

Having described our invention, we claim:

1. The process of making butter, comprising the steps of adding sulphur dioxide to the cream prior to shipment, oxidizing the sulphur dioxide by means of hydrogen peroxide after shipment, fermenting the cream, and churning the cream into butter.

2. The process of making butter, comprising the steps of adding sulphur dioxide to the cream prior to shipment to inhibit fermentation, oxidizing the sulphur dioxide after shipment to permit fermentation, and churning the cream into butter.

In witness whereof, we hereunto subscribe our names.

GEOFFREY ARTHUR GRAY.
MORTON BERNHARD NEWBURGER.